US010450892B2

(12) United States Patent
Ranjan

(10) Patent No.: US 10,450,892 B2
(45) Date of Patent: Oct. 22, 2019

(54) THERMAL MANAGEMENT OF TURBINE CASING USING VARYING WORKING MEDIUMS

(71) Applicant: UNITED TECHNOLOGIES CORPORATION, Farmington, CT (US)

(72) Inventor: Ram Ranjan, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 276 days.

(21) Appl. No.: 15/495,339

(22) Filed: Apr. 24, 2017

(65) Prior Publication Data

US 2018/0306060 A1 Oct. 25, 2018

(51) Int. Cl.
*F01D 25/14* (2006.01)
*F01D 25/24* (2006.01)
*F01D 25/12* (2006.01)
*F02C 7/16* (2006.01)

(52) U.S. Cl.
CPC ............ *F01D 25/14* (2013.01); *F01D 25/12* (2013.01); *F01D 25/24* (2013.01); *F02C 7/16* (2013.01); *F05D 2260/207* (2013.01); *F05D 2260/208* (2013.01); *F05D 2300/502* (2013.01)

(58) Field of Classification Search
CPC . F02C 7/16; F01D 25/14; F01D 25/12; F01D 25/24; F05D 2260/207; F05D 2300/502; F05D 2260/20; F01P 2003/2278; Y10S 60/912
See application file for complete search history.

(56) References Cited

U.S. PATENT DOCUMENTS

| 7,866,159 | B2 * | 1/2011 | Bowman ................... F02C 9/20 60/772 |
| 7,900,438 | B2 * | 3/2011 | Venkataramani ....... F01D 9/065 244/134 B |
| 8,015,788 | B2 | 9/2011 | Stephenson et al. |
| 2007/0017208 | A1 | 1/2007 | Ralls |
| 2016/0290233 | A1 * | 10/2016 | Ekanayake ............. F01K 23/02 |
| 2016/0290235 | A1 | 10/2016 | Ekanayake et al. |

FOREIGN PATENT DOCUMENTS

EP 2148045 A1 * 1/2010 ............. F01D 25/14

OTHER PUBLICATIONS

Enertron, Heat Pipe Selection, Dec. 4, 2001, pp. 2-6.*

* cited by examiner

*Primary Examiner* — Kenneth Bomberg
*Assistant Examiner* — Andrew Thanh Bui
(74) *Attorney, Agent, or Firm* — Snell & Wilmer, L.L.P.

(57) ABSTRACT

A turbine casing may comprise a casing body and a first heat pipe disposed in the casing body. The first heat pipe may comprise a first working medium. The first heat pipe may include a first vaporization section and a first condensation section. The first vaporization section may be located forward the first condensation section. A second heat pipe may be disposed in the casing body and may comprise a second working medium different from the first working medium.

20 Claims, 8 Drawing Sheets

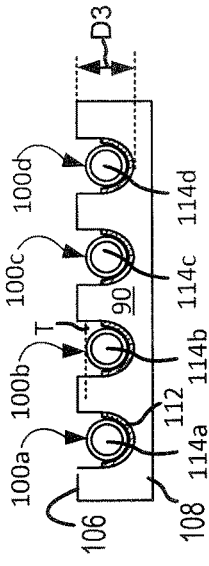
FIG. 3D
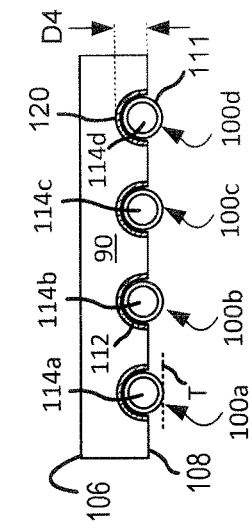
FIG. 3E
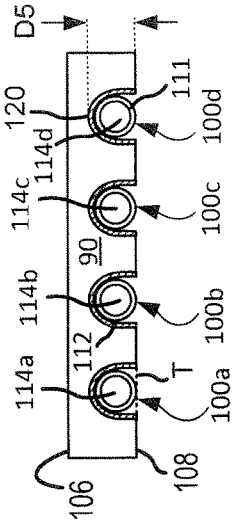
FIG. 3F
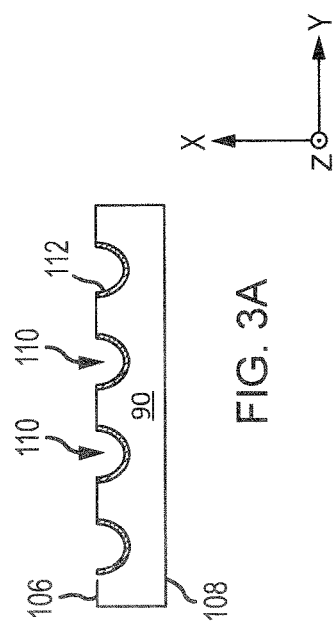
FIG. 3A
FIG. 3B
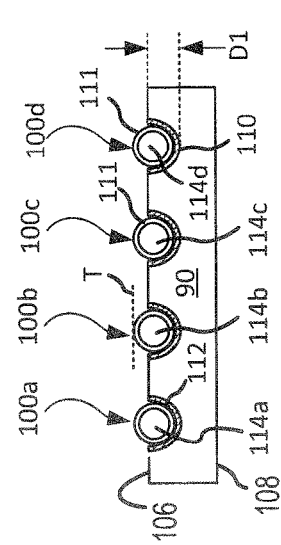
FIG. 3C
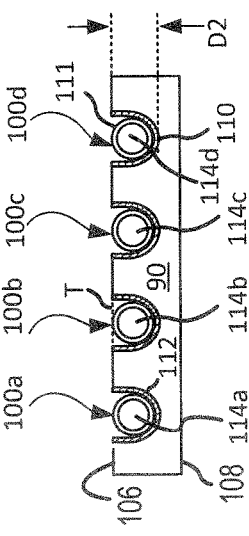

THERMAL MANAGEMENT OF TURBINE CASING USING VARYING WORKING MEDIUMS

FIELD

The present disclosure relates to cooling structures for gas turbine engines, and, more specifically, to cooling structures for turbine casings.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The turbine section typically includes low pressure and high pressure turbines and a turbine casing surrounding the low pressure and high pressure turbines.

The turbine casing may encounter high thermal gradients in an axial direction across the high pressure turbine and low pressure turbine regions of the casing. The high temperature gradients can cause large deformations in the structure of the turbine casing which may lead to increased thermo-mechanical stresses in the turbine casing structure. Further, variation of the conditions during a flight, e.g., variations in pressure and/or temperature, pose integration and operability challenges for thermal management systems.

SUMMARY

A turbine casing is provided according to various embodiments. A turbine casing may comprise a casing body and a first heat pipe disposed in the casing body. The first heat pipe may comprise a first working medium. The first heat pipe may include a first vaporization section and a first condensation section. The first vaporization section may be located forward the first condensation section. A second heat pipe may be disposed in the casing body and may comprise a second working medium different from the first working medium.

In various embodiments, a first boiling point of the first working medium may be greater than a second boiling point of the second working medium. The first boiling point may be greater than or equal to 900 Kelvin (K). The first working medium may comprise at least one of cesium, sodium, potassium, lithium, calcium, or indium. The second working medium may comprise at least one of ethanol, water, mercury, sulfur, or ammonia.

In various embodiments, at least one of the first heat pipe or the second heat pipe may be disposed within a groove formed in at least one of an outer surface of the turbine casing or an inner surface of the turbine casing. In various embodiments, at least one of the first working medium or the second working medium may be in contact with an internal surface of the casing body. In various embodiments, the first vaporization section may located in a high pressure turbine region of the casing body and the first condensation section may be located in a low pressure turbine region of the casing body.

In various embodiments, a plurality of high temperature heat pipes may be disposed in the casing body. The plurality of high temperature heat pipes may include the first heat pipe. A plurality of low temperature heat pipes may be disposed in the casing body. The plurality of low temperature heat pipes may include the second heat pipe. The high temperature heat pipes and the low temperature heat pipes may be arranged around a circumference of the turbine casing in an alternating high temperature heat pipe low temperature heat pipe configuration.

In various embodiments, a gas turbine engine may comprise a high pressure turbine and a low pressure turbine aft of the high pressure turbine. A turbine casing may be disposed around the high pressure turbine and the low pressure turbine. A first heat pipe may be disposed in the turbine casing and may comprise a first working medium. The first heat pipe may include a first vaporization section radially outward from the high pressure turbine and a first condensation section aft of the first vaporization section. A second heat pipe may be disposed in the turbine casing and may comprise a second working medium different from the first working medium.

In various embodiments, a second condensation section of the second heat pipe may be radially outward from the low pressure turbine. A first boiling point of the first working medium may be greater than a second boiling point of the second working medium. The first boiling point may be greater than or equal to 900 K. The first working medium may comprise at least one of cesium, sodium, potassium, lithium, calcium, or indium, and the second working medium comprises at least one of ethanol, water, mercury, sulfur, or ammonia. The first heat pipe may be disposed in a groove formed in at least one of an outer surface of the turbine casing or an inner surface of the turbine casing.

In various embodiments, the first heat pipe may be surrounded by the turbine casing. An internal surface of the turbine casing may contact the first working medium. In various embodiments a plurality of high temperature heat pipes may be disposed in the turbine casing and may include the first heat pipe. A plurality of low temperature heat pipes may be disposed in the turbine casing and may include the second heat pipe. The high temperature heat pipes and the low temperature heat pipes may be arranged around a circumference of the turbine casing in an alternating high temperature heat pipe low temperature heat pipe configuration.

In various embodiments, a method of cooling a turbine casing may comprise disposing a first vaporization section of a first heat pipe at a high pressure turbine region of the turbine casing, disposing a first condensation section of the first heat pipe in a region of the turbine casing aft of the high pressure turbine region, and disposing a second heat pipe in the turbine casing. The first heat pipe may comprise a first working medium and the second heat pipe may comprise a second working medium different from the first working medium.

In various embodiments, a first boiling point of the first working medium may be greater than a second boiling of the second working medium.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 3A, 3B, 3C, 3D, 3E, 3F, 3G, 3H, 3I, 3J illustrate a cross-sectional view of a portion of a turbine casing including a cooling system comprising heat pipes having working medium of varying boiling points, in accordance with various embodiments;

DETAILED DESCRIPTION

Figure 1:
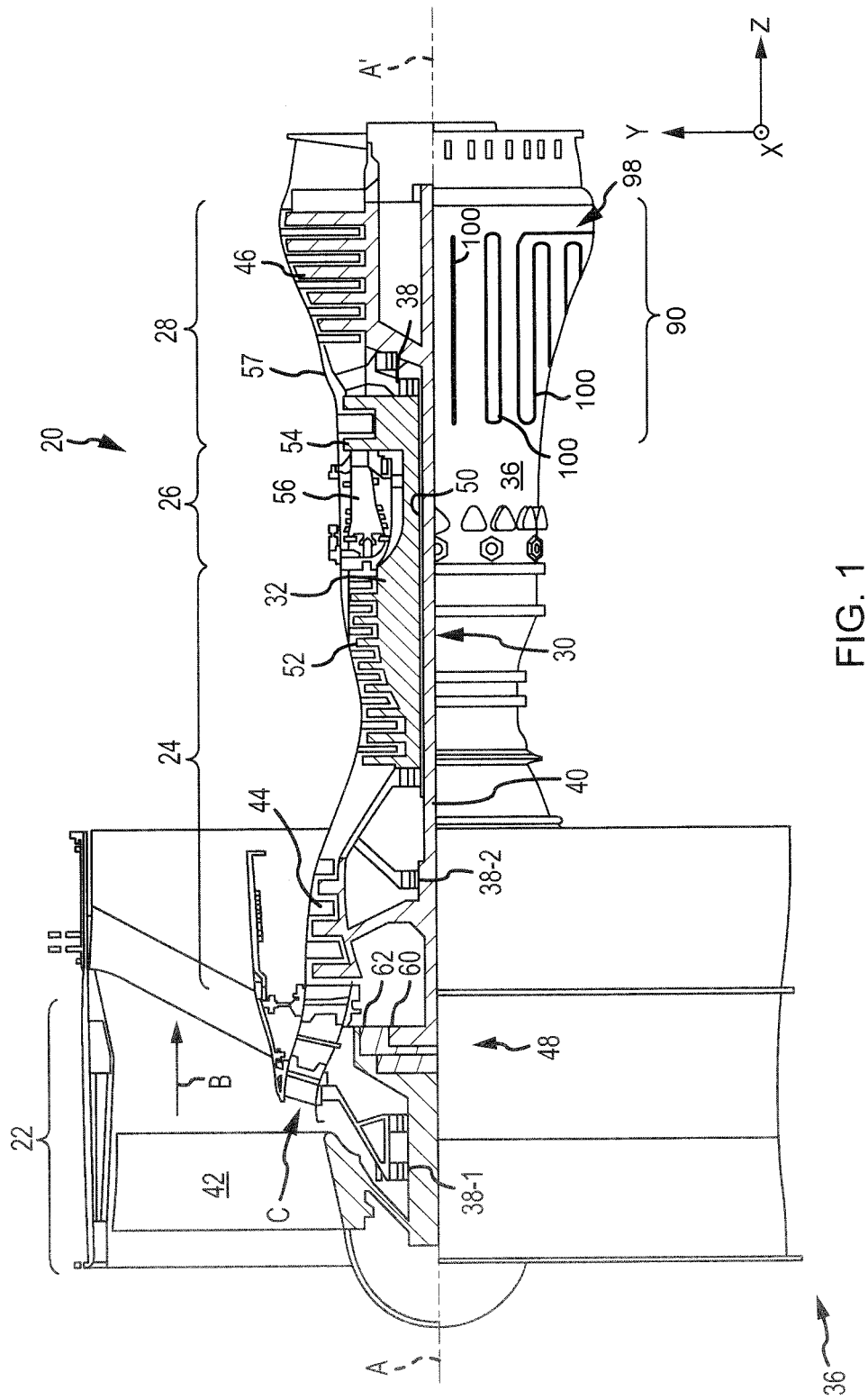
FIG. 1 illustrates a cross-sectional view of an exemplary gas turbine engine, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. As used herein, "distal" refers to the direction outward, or generally, away from a reference component. As used herein, "proximal" and/or "proximate" refer to a direction inward, or generally, towards the reference component.

A turbine casing having a high pressure region at or near a high pressure turbine and a low pressure region at or near a low pressure turbine may include a cooling system, for example, a heat pipe. The cooling system may remove heat from the turbine casing to equalize and/or reduce the temperature throughout the turbine casing. Various cooling features may be formed at the high pressure and low pressure regions of the turbine casing, depending on the design and function of the turbine casing. The present disclosure describes a turbine casing having a cooling system comprising heat pipes that include working medium of varying boiling points, with the heat pipes disposed, a least partially, within the body of the turbine casing. Several such heat pipes having working medium of varying boiling points may be arranged in parallel (i.e., circumferentially adjacent to one another) to transport heat from hotter to cooler regions of the turbine casing. In various embodiments, heat pipes having working medium of varying boiling points may be arranged in series (i.e., axially adjacent to one another) to transport heat over longer distances spanning a wide range of temperatures.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 (also referred to as an engine case structure) via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine case structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Engine case structure 36 may include a turbine casing 90 (also referred to herein as a casing body) extending from a forward edge of high pressure turbine 54 to an aft edge of low pressure turbine 46. Turbine casing 90 may have a generally annular shape and may surround high pressure turbine 54 and low pressure turbine 46. Turbine casing 90 may comprise a ceramic, a ceramic matrix composite, a metal (e.g., aluminum, copper, titanium, etc.), an alloy (e.g., steel, stainless steel, aluminum alloy, titanium, etc.), or other thermally conductive material, or combinations of thereof. A cooling system 98 comprising a plurality of heat pipes 100 may be located in turbine casing 90.

Figure 2A:
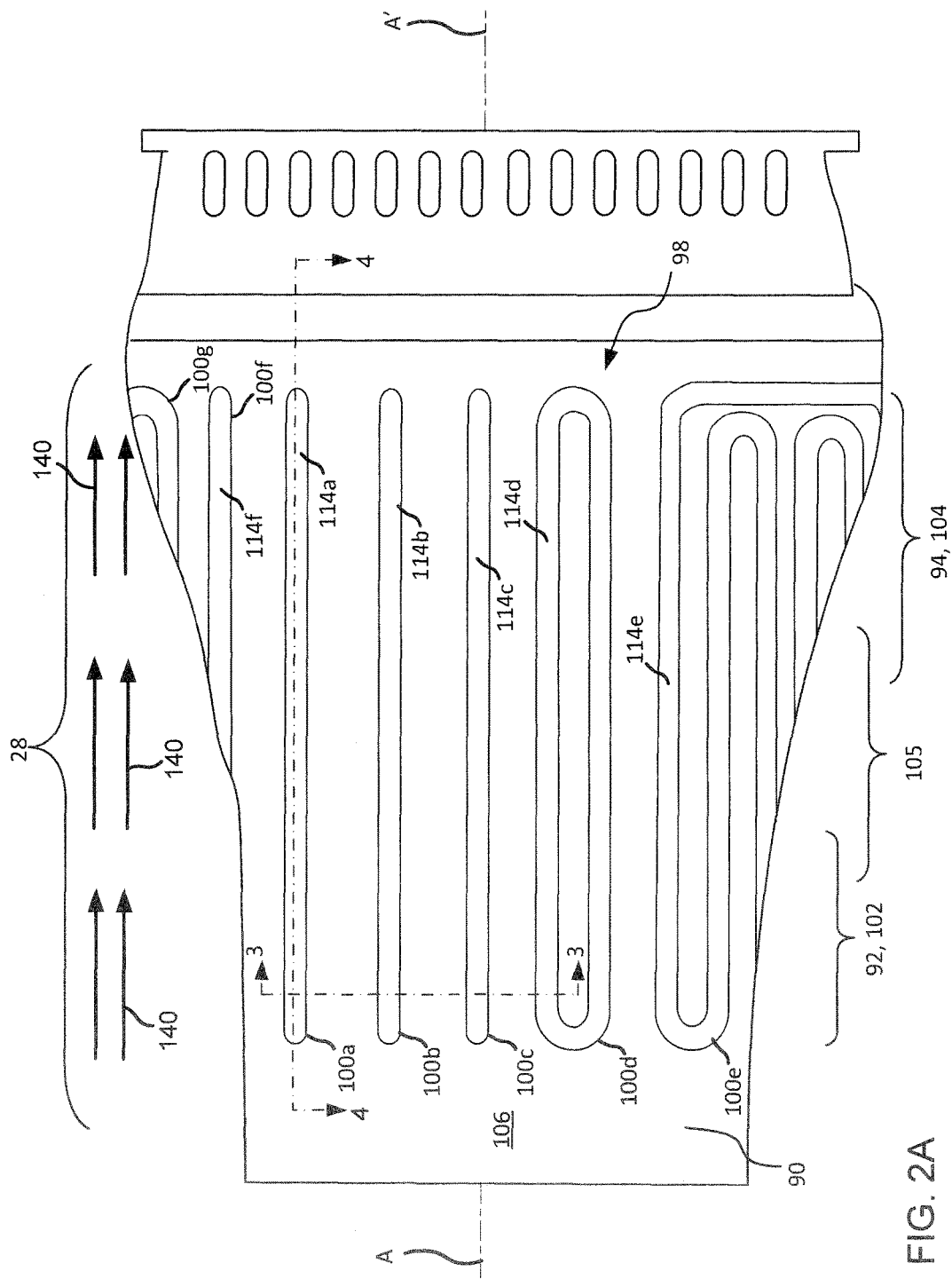
FIGS. 2A and 2B illustrate a turbine casing including a cooling system comprising heat pipes having working medium of varying boiling points, according to various embodiments.

With reference to FIG. 2A, a portion of gas turbine engine 20 comprising turbine casing 90 is illustrated, in accordance with various embodiments. Turbine casing 90 may comprise a high pressure turbine region 92 and a low pressure turbine region 94. High pressure turbine region 92 may correspond to the portion of turbine casing 90 that is radially outward from high pressure turbine 54. Low pressure turbine region 94 may correspond to the portion of turbine casing 90 that is radially outward from low pressure turbine 46. Turbine casing 90 may further comprise cooling system 98 configured to remove heat from turbine casing 90, particularly from high pressure turbine region 92. Cooling system 98 may include a plurality of heat pipes 100 (e.g., heat pipes 100a-100g) disposed around a circumference of turbine casing 90 and extending between high pressure turbine region 92 and low pressure turbine region 94.

Heat pipes 100 may each comprise a vaporization section 102 and a condensation section 104. Vaporization section 102 may be located in, and correspond to, high pressure turbine region 92 of turbine casing 90. In other words, vaporization section 102 may be radially outward from high pressure turbine 54. Condensation section 104 may be located in, and correspond to, low pressure turbine region 94 of turbine casing 90. In other words, condensation section 104 may be radially outward from low pressure turbine 46. Heat pipes 100 may each comprise a heat fluid conduit section 105 connecting vaporization section 102 and condensation section 104.

Cooling system 98 may include oscillating heat pipes, loop heat pipes, capillary heat pipes, and combinations thereof. Cooling system 98 may include heat pipes disposed in a serpentine layout (e.g., heat pipe 100e), an annular or loop layout (e.g., heat pipe 100d), a linear layout (e.g., heat pipe 100c), or any other suitable pattern or layout, and/or combination thereof.

Heat pipes 100 each include a working medium 114. For example, heat pipe 100a includes working medium 114a, heat pipe 100b includes working medium 114b, heat pipe 100c includes working medium 114c, etc. Working medium 114 may be a fluid that can pass between the vaporization section 102, the heat fluid conduit section 105, and the condensation section 104 of heat pipes 100.

Heat pipes 100 use an evaporative cooling cycle to transfer thermal energy through the evaporation and condensation of working medium 114. Vaporization section 102 of heat pipes 100 may be disposed within high pressure turbine region 92 of turbine casing 90. Heat pipes 100 are in thermal communication with the turbine casing 90. The working medium 114 in the vaporization section 102 of heat pipes 100 absorbs thermal energy present in vaporization section 102 and transfers that absorbed thermal energy to condensation section 104. Working medium 114 is distributed to the vaporization section 102 in a liquid state. Thermal energy absorbed by turbine casing 90 from high pressure turbine 54 heats vaporization section 102 of heat pipes 100. Thermal energy may be conducted from turbine casing 90, particularly high pressure turbine region 92, to working medium 114 within heat pipes. The transfer of thermal energy from the turbine casing 90 to working medium 114 increases the temperature of the working medium 114 in vaporization section 102. The heating of vaporization section 102 may cause the working medium 114 in vaporization section 102 to evaporate. Working medium 114 absorbs thermal energy and is converted to a gaseous state when its boiling point is reached. The working medium 114 in the gaseous state may then pass to condensation section 104 via heat fluid conduit section 105.

Condensation section 104 may be disposed in an area away from high pressure turbine region 92, for example, in low pressure turbine region 94. Stated another way, condensation section 104 may be disposed in an area that tends to be cooler than high pressure turbine region 92. Condensation section 104 may be disposed radially outward of low pressure turbine 46. Condensation section 104 may be in fluid communication with an airflow source, such as an upstream compressor in the compressor section 24 (FIG. 1) or other source that provides a cooling airflow 140 around low pressure turbine region 94, for example, bleed compressor air or bypass airflow B (FIG. 1).

The cooling airflow 140 flows around condensation section 104 absorbs thermal energy from condensation section 104, removing thermal energy from working medium 114, and causing the vaporized working medium 114 to condense back to a liquid state. The working medium 114 in the liquid state may then be transported back to vaporization section 102 via heat fluid conduit section 105. Working medium 114 physically moves between vaporization section 102 and condensation section 104, in order to transfer thermal energy between the locations where vaporization and condensation occur, thereby removing heat from turbine casing 90 and reducing a thermal gradient across turbine casing 90.

The composition of working medium 114 used in heat pipes 100 may be selected according to the particular operating conditions at which heat transfer is desired. In various embodiments, heat pipes 100 comprise working mediums of varying boiling points. For example, a first heat pipe 100a may be configured to transfer heat over high range operating temperatures, for example, 700 K and greater, and a second heat pipe 100b may be configured to transfer heat over lower range operating temperatures, for example, between 270 K and 700 K. In various embodiments, first heat pipe 100a, may include a first working medium 114a having a boiling point of 900 K or greater at 1 atmosphere (atm) (1.01 bar) and second heat pipe 100b may include a second working medium 114b having a boiling point at 1 atm (1.01 bar) that is less than the boiling point of first working medium 114a at 1 atm (1.01 bar). For example, second working medium 114b may have a boiling point between 300 K and 900 K at 1 atm (1.01 bar). In various embodiments, first heat pipe 100a may comprise a high temperature heat pipe (i.e., a heat pipe that includes a working medium having an operating range above 700 K), and second heat pipe 100b may comprise a low temperature heat pipe (i.e., a heat pipe that includes a working medium having an operating range between 270 K and 700 K).

In various embodiments, cooling system 98 may include a first heat pipe, for example, heat pipe 100a, comprising a high temperature heat pipe (i.e., a heat pipe which includes a working medium having an operating range above 700 K), a second heat pipe, for example heat pipe 100b, comprising an intermediate temperature heat pipe (i.e., a heat pipe which includes a working medium having an operating range between 400 K and 900 K), and a third heat pipe, for example heat pipe 100c, comprising a low temperature heat pipe (i.e., a heat pipe that includes a working medium having an operating range below 550 K).

In various embodiments, heat pipes 100 may be arranged around the circumference of turbine casing 90 in an alternating high temperature heat pipe low temperature heat pipe configuration. For example, in various embodiments, heat pipes 100a, 100c, 100e, and 100g may include working mediums 114a, 114c, 114e, 114g, respectively, which each have a boiling point of 900 K or greater at 1 atm and heat pipes 100b, 100d, and 100f include working mediums 114b, 114d, and 114f, respectively, which each have having a boiling point of less than 900 K at 1 atm.

In various embodiments, high temperature heat pipes comprising a working medium capable of operating at temperatures above 700 K may be concentrated in areas along the circumference of turbine casing 90 that experience increased inflight temperatures, while low temperature heat pipes comprising a working medium capable of operating at temperatures below 700 K may be concentrated in areas along the circumference of turbine casing 90 that experience lower inflight temperatures.

Figure 2B:
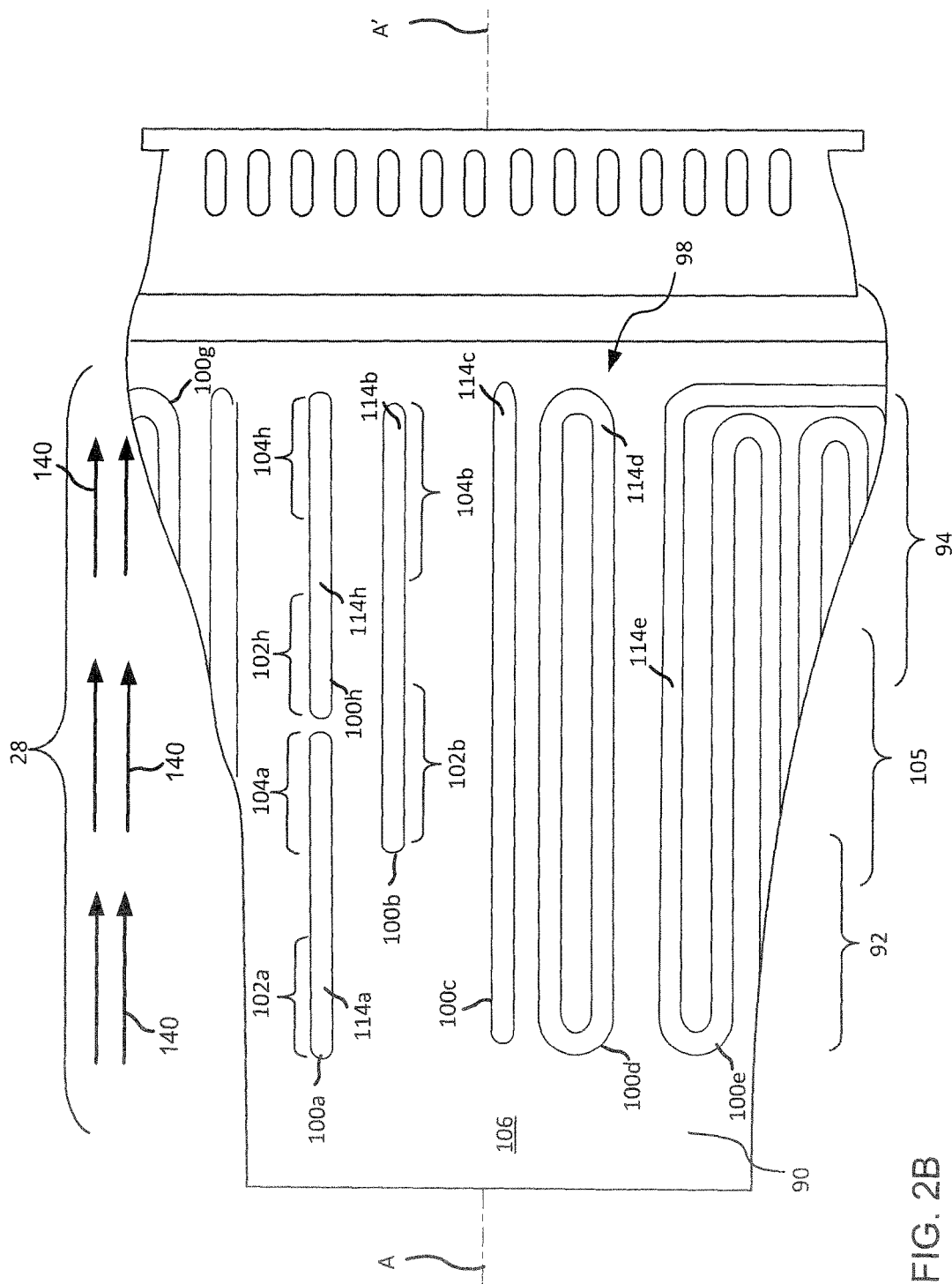

In various embodiments, heat pipes 100 having working medium 114 with varying boiling points may be arranged in series between high pressure turbine region 92 and low pressure turbine region 94. For example, with reference to FIG. 2B, cooling system 98 may include may include a first heat pipe 100a. Heat 100a comprises a vaporization section 102a, a condensation section 104a, and a working medium 114a having a boiling point of for example, greater than 900 K at 1 atm (1.01 bar) disposed therein. First heat pipe 100a may be disposed proximate to high pressure turbine region 92. A second heat pipe 100h may be disposed aft of first heat pipe 100a. Second heat pipe 100h may include a vaporization section 102h, a condensation section 104h, and a working medium 114h, comprising a boiling point between, for example, 400 K and 900 K at 1 atm (1.01 bar) disposed there. Heat pipes 100a and 100h may be arranged such that condensation section 104a of first heat 100a is axially adjacent to the vaporization section 102h of the second heat pipe 100h. While two heat pipes (e.g. heat pipe 100a and heat pipe 100h are illustrated in series, cooling system 98 may include any number of heat pipes 100 arranged in series. For example, in various embodiments, a third heat pipe may be disposed aft of second heat pipe 100h and may have a working medium 114 comprising a boiling point of, for example, 400 K or less at 1 atm (1.01 bar).

In various embodiments, first heat pipe 100a may be arranged in series with a circumferentially adjacent second heat pipe 100b such that condensation section 104a of the first heat pipe 100a may be located circumferentially adjacent to the vaporization section 102b of the second heat pipe 100b. Second heat pipe 100b may include a second working 114b having a boiling point which is less than the boiling point of first working medium 114a. Condensation section 104b of second heat pipe may be located in low pressure turbine region 94 of turbine casing 90. In various embodiments, adjacent (circumferentially adjacent or axially adjacent) condensation and vaporization sections may be integrally fabricated to reduce thermal resistance between the sections. In various embodiments, adjacent (circumferentially adjacent or axially adjacent) condensation and vaporization sections may be configured to transfer heat via a thermal interface material.

High temperature heat pipes, for example, heat pipes 100a, 100c, and 100e may remove heat from high pressure turbine region 92 and tend to reduce a temperature gradient across turbine casing 90 in high temperature conditions (i.e., above 700 K) while the low temperature heat pipes, for example, heat pipes 100b, 100d, and 100f may remove heat from high pressure turbine region 92 and tend to reduce a temperature gradient across turbine casing 90 in low temperature conditions (i.e., below 700 K). Heat pipes 100 including working medium 114 having varying boiling points at, for example, 1 atm (1.01 bar), may be configured such that heat is removed from turbine casing 90 throughout a flight. In other words, heat pipes 100 may remove heat from turbine casing 90 across all inflight engine operating temperatures and conditions. Heat pipes 100 having varying working medium 114 may be configured such that an axial temperature gradient across turbine casing 90 is reduced throughout a flight (i.e., across all inflight engine operating temperatures and conditions).

Cooling system 98 comprising heat pipes 100 having working mediums 114 with varying boiling points may remove heat from the high pressure turbine region 92 and reduce the temperature gradient between high pressure turbine region 92 and low pressure turbine region 94. A decreased temperature gradient may reduce structural deformations of turbine casing 90 and the associated thermal stresses. Alternating high temperature and low temperature heat pipes around a circumference of turbine casing may provide a thermal management system capable of removing heat from turbine casing 90 and reducing a temperature gradient across turbine casing 90 throughout a flight and over a vast spectrum of inflight conditions.

Cooling system 98 may be used in concert with other turbine case cooling schemes (e.g., pipes and vanes that direct cooling air from the compression portion of the engine to the turbine case) to augment or mitigate an amount of cooling required from the other cooling systems.

Figure 4:
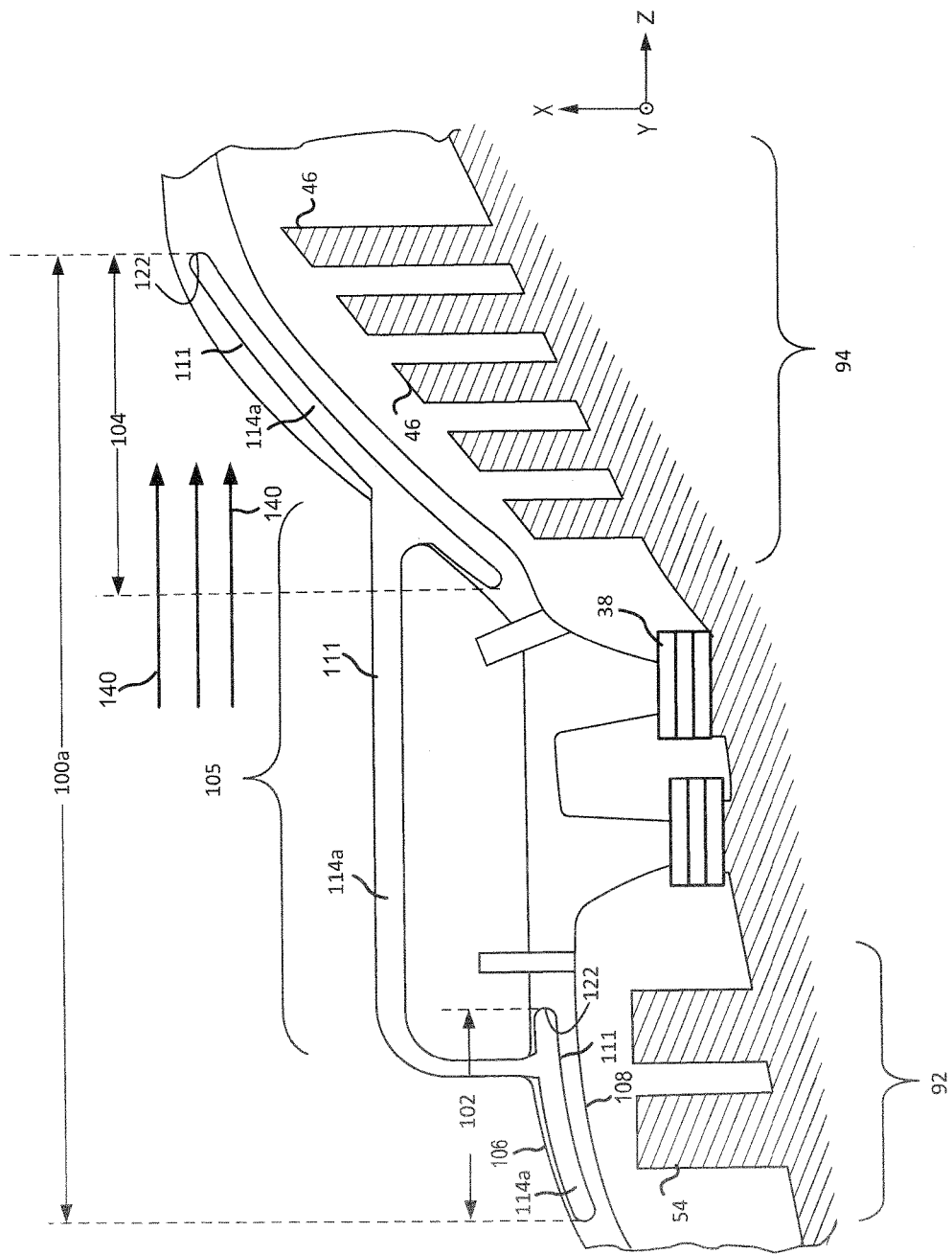
FIG. 4 illustrates a cross-sectional view of a portion of a turbine casing including a cooling system comprising heat pipes having working medium of varying boiling points, in accordance with various embodiments.

FIG. 4 illustrates a cross-sectional view of a portion of turbine casing 90 taken along line 4-4 of FIG. 2A, in accordance with various embodiments. With reference to FIG. 4, elements with like element numbering as depicted in FIG. 1 and FIG. 2A, are intended to be the same and will not necessarily be repeated for the sake of clarity. Heat pipe 100a may be at least partially disposed within or integrally formed within turbine casing 90. In various embodiments, vaporization section 102, condensation section 104, and/or heat fluid conduit section 105 of heat pipe 100a may be formed as a chamber within turbine casing 90 such that an internal surface 122 of turbine casing 90 defines vaporization section 102, condensation section 104, and/or heat fluid conduit section 105 of heat pipe 100a, and working medium 114a within heat pipe 100a physically contacts internal surface 122 of turbine casing 90.

In various embodiments, vaporization section 102, condensation section 104, and/or heat fluid conduit section 105 of heat pipe 100a may be defined by a heat pipe tube 111 disposed within turbine casing 90. For example, heat pipe tube 111 may comprise a sealed tube containing working medium 114a. An outer surface of heat pipe tube 111 may be in direct physical contact with internal surface 122 of turbine casing 90, or in contact with internal surface 122 through a thermally conductive adhesive. In various embodiments, heat pipe tube 111 may be disposed within a pre-formed groove or opening in turbine casing 90. Heat pipe tube 111 may be formed from a metal, metal alloy, or other thermally conductive material. In various embodiments, heat pipe tube 111 may comprise aluminum, copper, silica, nickel, titanium, stainless steel, iron, tungsten, or tantalum.

The material of heat pipe tubes 111 may be selected based on the working medium 114 that will be contained with heat pipe tubes 111. For example, stainless steel, nickel, titanium, or tungsten may be used to form heat pipes tubes 111 that contain a high temperature working medium 114 (i.e., a working medium suitable for use at operating temperatures of above 700 K). Stainless steel, copper, silica, nickel, or aluminum may be used to form heat pipe tubes 111 that contain a lower temperature working medium (i.e., a working medium 114 suitable for operating at temperatures below 700 K). Using a thermally conductive material (e.g., a metal or metal alloy) to form heat pipe tubes 111 may allow heat pipe tubes 111 to contribute to heat transfer between high pressure turbine region 92 and low pressure turbine region 94 even when the operating temperature is outside of the heat pipe's normal operating range. For example, a heat pipe 100a containing a working medium 114a having an operating range between 700 K and 1200 K (e.g., cesium) will not transfer heat via an evaporative cooling cycle at temperatures below 700 K or above 1200 K. However, the thermally conductive material of heat pipe tube 111 may still transfer some heat from high pressure turbine region 92 to low pressure turbine region 94 at these temperatures (i.e., outside the operating range of working medium 114a).

In various embodiments, vaporization section 102, condensation section 104, and heat fluid conduit section 105 of heat pipe 100a may each be configured to be in direct physical contact with turbine casing 90 or in contact with turbine casing 90 through a thermally conductive adhesive. In various embodiments, vaporization section 102 and condensation section 104 may be in direct physical contact with turbine casing 90 (or in contact with a surface of turbine casing 90 through a thermally conductive adhesive) and heat fluid conduit section 105 may extend between vaporization section 102 and condensation section 104 without being in physical contact with turbine casing 90. In other words, the heat pipe tube 111 in heat fluid conduit section 105 is exposed from turbine casing 90. Turbine casing 90 may be fabricated using superplastic forming, advanced additive machining techniques, or other suitable manufacturing processes.

FIGS. 3A-3J illustrate a cross-sectional view of a portion of turbine casing 90 along line 3-3 of FIG. 2A, in accordance with various embodiments. With reference to FIGS. 3A-3J, elements with like element numbering as depicted in FIG. 2A, are intended to be the same and will not necessarily be repeated for the sake of clarity.

FIG. 3A, shows turbine casing 90 with heat pipes 100a-100d removed for clarity. Turbine casing 90 includes an outer surface 106 and an inner surface 108 opposite outer surface 106. Outer surface 106 of turbine casing 90 is oriented radially outward; in other words, away from high pressure turbine 54 and low pressure turbine 46 (FIG. 1). Inner surface 108 of turbine casing 90 is oriented radially inward such that inner surface 108 faces high pressure turbine 54 and low pressure turbine 46 (FIG. 1).

In various embodiments, a plurality of grooves 110 may be formed in outer surface 106 of turbine casing 90. Grooves 110 may extend partially through turbine casing 90 such that a portion of turbine casing 90 remains between the bottom surface of grooves 110 and inner surface 108 of turbine casing 90. Grooves 110 may be formed having a curved surface. The surface of grooves 110 may be formed to mirror the shape of heat pipes 100. A thermally conductive material 112 may be disposed in grooves 110. In various embodiments, thermally conductive material 112 may be a thermally conductive adhesive.

FIG. 3B illustrates heat pipes 100a-100d disposed in grooves 110, in accordance with various embodiments. Thermally conductive material 112 may be disposed between heat pipes 100a-100d and turbine casing 90. Thermally conductive material 112 may couple and/or secure heat pipes 100a-100d to turbine casing 90. Thermally conductive material 112 may aid in the transfer of heat between turbine casing 90 and heat pipes 100a-100d. Thermally conductive material 112 may comprise a thermal epoxy, thermal epoxy resin, thermally conductive paste, thermal grease, or thermal tape. Thermally conductive material 112 may also be disposed on the surface of heat pipe tube 111 prior to mounting heat pipe tube 111 to turbine casing 90.

A depth D1 of grooves 110 may be selected so that heat pipes 100a-100d extend beyond (i.e., radially outward from) outer surface 106 of turbine casing 90. Said another way, grooves 110 may be configured such that a line T, which is tangent to heat pipes 100a-100d and parallel to outer surface 106, is radially outward from outer surface 106.

FIG. 3C illustrates heat pipes 100a-100d as coplanar with outer surface 106, in accordance with various embodiments. A depth D2 of grooves 110 may be selected such that line T, which is tangent to heat pipes 100a-100d and parallel to outer surface 106 of turbine casing 90, is coplanar with outer surface 106.

FIG. 3D illustrates heat pipes 100 as recessed with respect outer surface 106, in accordance with various embodiments. A depth D3 of grooves 110 may be selected such that line T, which is tangent to heat pipes 100a-100d and parallel to outer surface 106 of turbine casing 90, is recessed with respect to outer surface 106 (i.e., line T is radially inward from outer surface 106).

FIG. 3E illustrates heat pipes 100a-100d as extending beyond (i.e., radially inward from) inner surface 108 of turbine casing 90, in accordance with various embodiments. A plurality of grooves 120 may be formed in inner surface 108 of turbine casing 90. Grooves 120 may extend partially through turbine casing 90 such that a portion of turbine casing 90 remains between the bottom (i.e. radially outward) surface of grooves 120 and outer surface 106 of turbine casing 90. Grooves 120 may be formed having a curved surface. The surface of grooves 120 may be formed to mirror the shape of heat pipes 100a-100d. Heat pipes 100a-100d may be disposed in grooves 120. Thermally conductive material 112 may be disposed in grooves 120. Thermally conductive material 112 may be disposed between heat pipes 100a-100d and turbine casing 90. Heat pipes 100a-100d may extend beyond (i.e., radially inward from) inner surface 108 of turbine casing 90. In other words, a depth D4 of grooves 120 may be selected such that line T, which is tangent to heat pipes 100a-100d and parallel to inner surface 108 of turbine casing 90, is radially inward from inner surface 108.

FIG. 3F illustrates heat pipes 100a-100d as coplanar with outer surface 106, in accordance with various embodiments. A depth D5 of grooves 120 may be selected such that line T, which is tangent to heat pipes 100a-100d and parallel to inner surface 108 of turbine casing 90, is coplanar with inner surface 108.

Figure 3G:
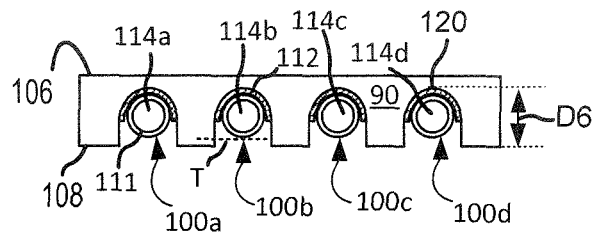

FIG. 3G illustrates heat pipes 100a-100d as recessed with respect inner surface 108, in accordance with various embodiments. A depth D6 of grooves 120 may be selected such that line T, which is tangent to heat pipes 100a-100d and parallel to inner surface 108 of turbine casing 90, is recessed with respect to inner surface 108 (i.e., line T is radially outward from inner surface 108).

Figure 3H:
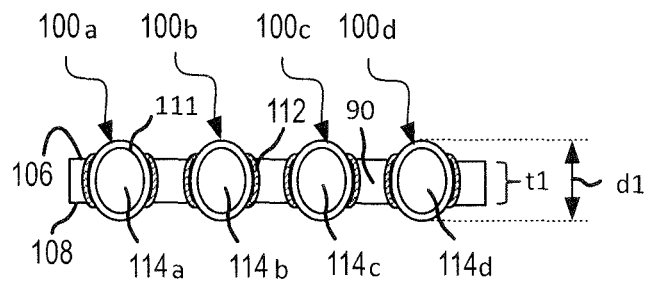

FIG. 3H illustrates heat pipes 100a-100d as extending beyond both inner surface 108 and outer surface 106 of turbine casing 90, in accordance with various embodiments. Heat pipes 100a-100d may be partially surrounded by turbine casing 90 such that a thickness t1 of turbine casing 90, extending from outer surface 106 to inner surface 108, is less than a diameter d1 of heat pipes 100a-100d. Thermally conductive material 112 may be disposed between the surface of heat pipe tubes 111 and turbine casing 90 and may couple heat pipes 100a-100d to turbine casing 90. Thermally conductive material 112 may aid in the transfer of heat between turbine casing 90 and heat pipes 100a-100d.

Figure 3I:
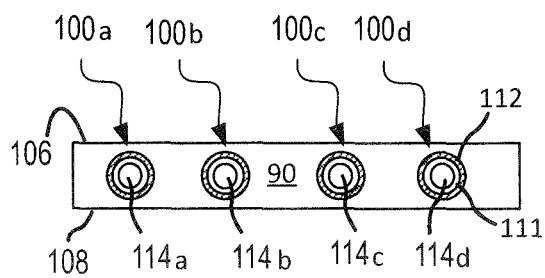

FIG. 3I illustrates heat pipes 100a-100d as surrounded by turbine casing 90, in accordance with various embodiments. Stated another way, turbine casing 90 may extend around an entire circumference of each heat pipe 100a-100d. Thermally conductive material 112 may be disposed between the surface of heat pipe tubes 111 and turbine casing 90 to couple heat pipes 100a-100d to turbine casing 90 and/or to aid in the transfer of heat between turbine casing 90 and heat pipes 100a-100d.

Figure 3J:
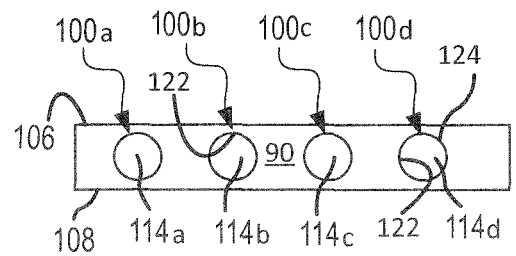

FIG. 3J illustrates heat pipes 100a-100d as integrally formed within turbine casing 90, in accordance with various embodiments. An internal surface 122 of turbine casing 90 may form a chamber 124 of heat pipes 100a-100d. Chamber 124 may form a sealed heat pipe tube within which working medium 114a-114d may be disposed. Stated another way, internal surface 122 turbine casing 90 may be in direct physical contact with working medium 114. Working medium 114a-114d may transfer heat from high pressure turbine region 92 to condensation section 104/low pressure turbine region 94. In various embodiments, chamber 124, which is defined by internal surface 122 of turbine casing 90, may extend from vaporization section 102 to heat fluid conduit section 105. Chamber 124 may further extend to condensation section 104. Vaporization section 102, heat fluid conduit section 105, and/or condensation section 104 of heat pipes 100a-100d may each be formed by a chamber 124. In other words, vaporization section 102, heat fluid conduit section 105, and/or condensation section 104 may each be defined by internal surface 122 of turbine casing 90.

In various embodiments, heat pipes 100a-100d may comprise a combination of heat pipe tubes 111 and chambers 124. For example, in various embodiments, vaporization section 102 may comprise a chamber 124 with working medium 114 disposed therein, and heat fluid conduit section 105 and condensation section 104 may comprise heat pipe tubes 111 with working medium 114 disposed therein. In various embodiments, vaporization section 102 and condensation section 104 may comprise chambers 124 with working medium 114 disposed therein, and heat fluid conduit section 105 may comprise a heat pipe tube 111 working medium 114 disposed therein. In various embodiments, vaporization section 102 and condensation section 104 may comprise heat pipe tubes 111 with working medium 114 disposed therein, and heat fluid conduit section 105 may comprise a chamber 124 with working medium 114 disposed therein.

Figure 5:
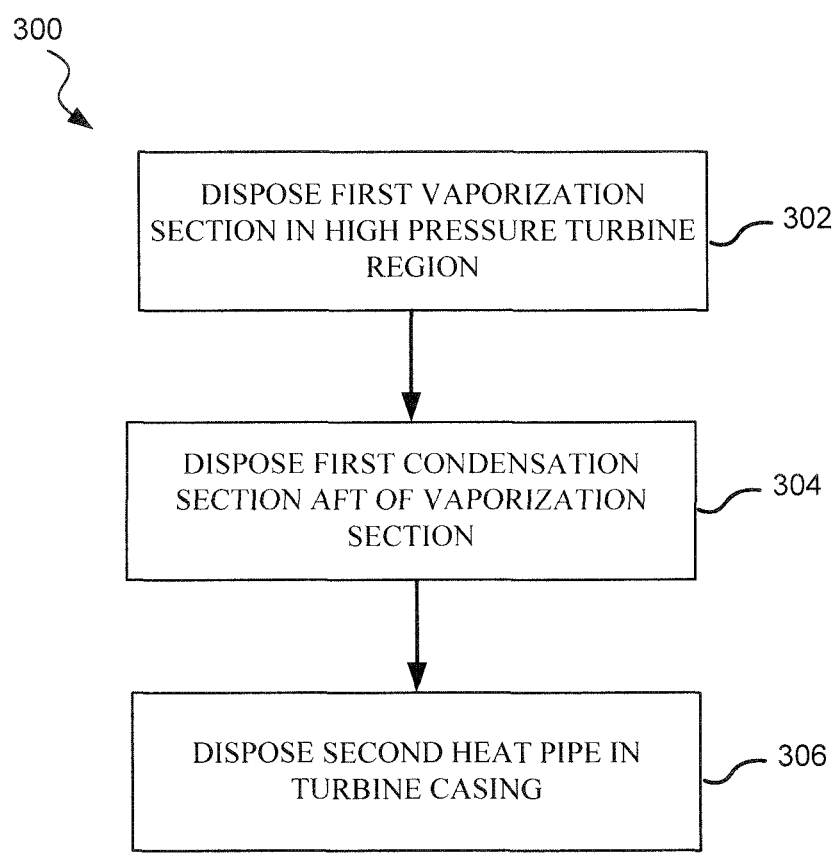
FIGS. 5 and 6 illustrate a method of cooling a turbine casing, in accordance with various embodiments.

With reference to FIG. 5, a method 300 for cooling a turbine casing is shown, in accordance with various embodiments. Method 300 may include the steps of disposing a first vaporization section of a first heat pipe in a high pressure turbine region of the turbine casing (step 302), disposing a first condensation section of the first heat pipe aft of the vaporization section of the first heat pipe (step 304), and disposing a second heat pipe in the turbine casing (step 306). In various embodiments, the first heat pipe may comprise a first working medium and the second heat pipe may comprise a second working medium different from the first working medium.

In various embodiments, with combined reference to FIG. 2A and FIG. 5, step 302 of method 300 may comprise disposing first vaporization section 102 of first heat pipe 100a in high pressure turbine region 92 of turbine casing 90. Step 304 may comprise disposing first condensation section 104 of first heat pipe 100a aft of vaporization section 102 of first heat pipe 100a. Step 306 may comprise disposing second heat pipe 100b in turbine casing 90. First heat pipe 100a may comprise first working medium 114a and second heat pipe 100b may comprise second working medium 114b. In various embodiments, the boiling point of first working medium 114a may be greater than the boiling point of second working medium 114b.

Figure 6:
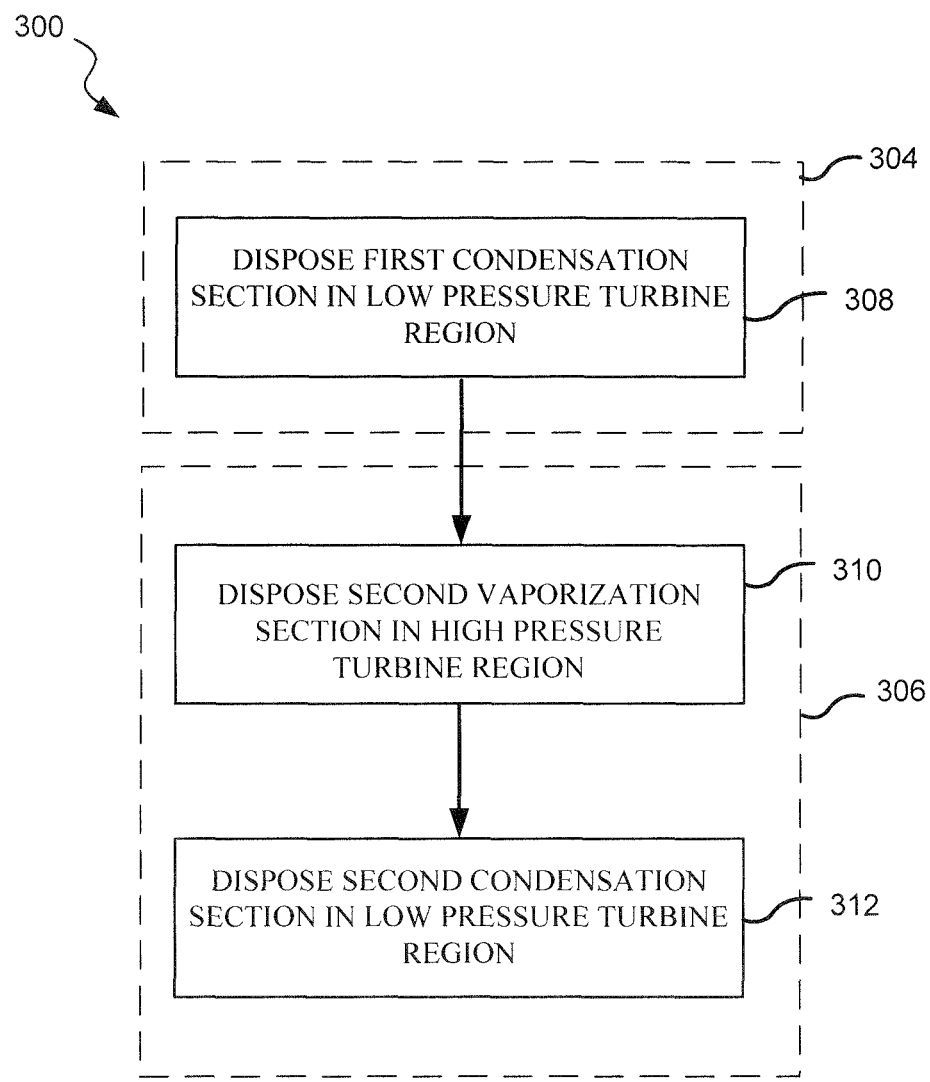

With reference to FIG. 6, in various embodiments, step 304 of method 300 may comprise disposing the first condensation section of the first heat pipe in a low pressure turbine region of the turbine casing (step 308). Step 306 of method 300 may comprise disposing a second vaporization section of the second heat pipe in the high pressure turbine region of the turbine casing (step 310), and disposing a second condensation section of the second heat pipe in the low pressure turbine region of the turbine casing (step 312).

In various embodiments, with combined reference to FIG. 2A and FIG. 6, step 308 may comprise disposing first condensation section 104 of first heat pipe 100a in low pressure turbine region 94 of turbine casing 90. Step 310 may comprise disposing second vaporization section 102 of second heat pipe 100b in high pressure turbine region 92 of turbine casing 90. Step 312 may comprise disposing second condensation section 104 of second heat pipe 100b in low pressure turbine region 94 of turbine casing 90.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A turbine casing, comprising:
   a casing body;
   a first heat pipe disposed in the casing body and comprising a first working medium having a first boiling point, the first heat pipe including a first vaporization section and a first condensation section, wherein the first vaporization section is located forward the first condensation section; and
   a second heat pipe disposed in the casing body and comprising a second working medium having a second boiling point different from the first boiling point of the first working medium, wherein the second heat pipe is circumferentially adjacent to the first heat pipe.

2. The turbine casing of claim 1, wherein the first boiling point of the first working medium is greater than the second boiling point of the second working medium.

3. The turbine casing of claim 2, wherein the first boiling point is greater than or equal to 900 Kelvin.

4. The turbine casing of claim 3, wherein the first working medium comprises at least one of cesium, sodium, potassium, lithium, calcium, or indium.

5. The turbine casing of claim 3, wherein the second working medium comprises at least one of ethanol, water, mercury, sulfur, or ammonia.

6. The turbine casing of claim 1, further comprising a groove formed in at least one of an outer surface of the turbine casing or an inner surface of the turbine casing, wherein the first heat pipe is disposed in the groove.

7. The turbine casing of claim 1, further comprising:
   a plurality of high temperature heat pipes disposed in the casing body, the plurality of high temperature heat pipes including the first heat pipe; and
   a plurality of low temperature heat pipes disposed in the casing body, the plurality of low temperature heat pipes including the second heat pipe, wherein the high temperature heat pipes and the low temperature heat pipes are arranged around a circumference of the turbine casing in an alternating high temperature heat pipe low temperature heat pipe configuration.

8. The turbine casing of claim 1, wherein at least one of the first working medium or the second working medium is in contact with an internal surface of the casing body.

9. The turbine casing of claim 1, wherein the first vaporization section is located in a high pressure turbine region of the casing body and the first condensation section is located in a low pressure turbine region of the casing body.

10. A gas turbine engine, comprising:
    a high pressure turbine;
    a low pressure turbine aft of the high pressure turbine;
    a turbine casing disposed around the high pressure turbine and the low pressure turbine;
    a first heat pipe disposed in the turbine casing and comprising a first working medium having a first boiling point, the first heat pipe including a first vaporization section radially outward from the high pressure turbine and a first condensation section aft of the first vaporization section; and
    a second heat pipe disposed in the turbine casing and comprising a second working medium having a second boiling point different from the first boiling point of the first working medium, wherein the second heat pipe is circumferentially adjacent to the first heat pipe.

11. The gas turbine engine of claim 10, wherein a second vaporization section of the second heat pipe is circumferentially adjacent to the first condensation section of the first heat pipe.

12. The gas turbine engine of claim 10, wherein the first boiling point of the first working medium is greater than the second boiling point of the second working medium.

13. The gas turbine engine of claim 12, wherein the first boiling point is 900 Kelvin or greater.

14. The gas turbine engine of claim 10, wherein:
the first working medium comprises at least one of cesium, sodium, potassium, lithium, calcium, or indium; and
the second working medium comprises at least one of ethanol, water, mercury, sulfur, or ammonia.

15. The gas turbine engine of claim 10, further comprising a groove formed in at least one of an outer surface of the turbine casing or an inner surface of the turbine casing, the first heat pipe is disposed in the groove.

16. The gas turbine engine of claim 10, wherein the first heat pipe is surrounded by the turbine casing.

17. The gas turbine engine of claim 10, wherein an internal surface of the turbine casing contacts the first working medium.

18. The gas turbine engine of claim 10, further comprising:
a plurality of high temperature heat pipes disposed in the turbine casing, the plurality of high temperature heat pipes including the first heat pipe; and
a plurality of low temperature heat pipes disposed in the turbine casing, the plurality of low temperature heat pipes including the second heat pipe, wherein the high temperature heat pipes and the low temperature heat pipes are arranged around a circumference of the turbine casing in an alternating high temperature heat pipe low temperature heat pipe configuration.

19. A method of cooling a turbine casing, comprising,
disposing a first vaporization section of a first heat pipe in a high pressure turbine region of the turbine casing, the first heat pipe comprising a first working medium having a first boiling point;
disposing a first condensation section of the first heat pipe aft of the first vaporization section; and
disposing a second heat pipe in the turbine casing and in a location circumferentially adjacent to the first heat pipe, the second heat pipe comprising a second working medium having a second boiling point different from the first boiling point of the first working medium.

20. The method of claim 19, wherein the first boiling point of the first working medium is greater than the second boiling of the second working medium.

* * * * *